(12) United States Patent
Kim

(10) Patent No.: US 11,787,469 B2
(45) Date of Patent: Oct. 17, 2023

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventor: Hongbum Kim, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 900 days.

(21) Appl. No.: 16/208,267

(22) Filed: Dec. 3, 2018

(65) Prior Publication Data

US 2020/0114963 A1 Apr. 16, 2020

(30) Foreign Application Priority Data

Oct. 15, 2018 (KR) .......................... 10-2018-0122296

(51) Int. Cl.
*B62D 6/04* (2006.01)
*B60W 10/20* (2006.01)
(Continued)

(52) U.S. Cl.
CPC ............... *B62D 6/04* (2013.01); *B60W 10/20* (2013.01); *B62D 6/10* (2013.01); *B62D 15/025* (2013.01)

(58) Field of Classification Search
CPC .......... B62D 6/04; B62D 6/10; B62D 15/025; B60W 10/20
See application file for complete search history.

(56) References Cited

U.S. PATENT DOCUMENTS

| | | |
|---|---|---|
| 6,556,909 B2 | 4/2003 | Matsumoto et al. |
| 7,753,162 B2 | 7/2010 | Shiozawa et al. |
| (Continued) | | |

FOREIGN PATENT DOCUMENTS

| | | |
|---|---|---|
| CN | 104002860 A | 8/2014 |
| CN | 107031707 A | 8/2017 |
| (Continued) | | |

OTHER PUBLICATIONS

Machine translation of KR-101629032-B1 (Year: 2016).*
(Continued)

*Primary Examiner* — Jeff A Burke
*Assistant Examiner* — Mohamad O El Sayah
(74) *Attorney, Agent, or Firm* — Fox Rothschild LLP

(57) ABSTRACT

A vehicle is capable of compensating for steering control based on vehicle's intrinsic factors and environmental influence factors, thereby performing steering compensation control accurately. The vehicle includes: a storage unit; a driving unit to drive a steering device; a sensor to acquire detection signals including a steering angle and a steering torque; and a controller to determine whether the vehicle is in a predetermined stable running state based on the detection signals, wherein, when the vehicle is in the predetermined stable running state, the controller extracts reference information including a relationship between the steering angle and the steering torque at one or more past time points, stores the reference information in the storage unit, and controls the driving unit based on a difference between the reference information and the steering angle and the steering torque.

8 Claims, 7 Drawing Sheets

(51) Int. Cl.
  *B62D 15/02*   (2006.01)
  *B62D 6/10*    (2006.01)

(56) References Cited

U.S. PATENT DOCUMENTS

| | | | |
|---|---|---|---|
| 9,545,949 B2 | 1/2017 | Yamazaki | |
| 2007/0029129 A1* | 2/2007 | Shiozawa | B62D 5/0472 |
| | | | 180/446 |
| 2010/0228440 A1* | 9/2010 | Yamazaki | B62D 6/008 |
| | | | 701/41 |
| 2014/0277944 A1 | 9/2014 | Bean et al. | |
| 2015/0344065 A1 | 12/2015 | Lee et al. | |
| 2017/0096166 A1* | 4/2017 | Kataoka | B62D 6/002 |
| 2017/0158226 A1* | 6/2017 | Lee | B62D 6/10 |
| 2018/0178834 A1* | 6/2018 | Moreillon | B62D 5/0463 |
| 2019/0367083 A1* | 12/2019 | Kodera | B62D 6/002 |

FOREIGN PATENT DOCUMENTS

| | | |
|---|---|---|
| DE | 10244070 A1 | 3/2004 |
| DE | 102006015636 A1 | 10/2007 |
| DE | 102007019739 A1 | 10/2008 |
| DE | 102009028181 A1 | 2/2011 |
| DE | 102011120917 A1 | 6/2013 |
| DE | 102016218863 A1 | 6/2017 |
| JP | 2005247158 A | 9/2005 |
| JP | 2007022373 A | 2/2007 |
| JP | 2007-62712 A | 3/2007 |
| JP | 2009-126244 A | 6/2009 |
| JP | 2015-205636 A | 11/2015 |
| JP | 2015205636 A * | 11/2015 |
| JP | 2019-206268 A | 12/2019 |
| KR | 1020100029435 A | 3/2010 |
| KR | 1020100051648 A | 12/2011 |
| KR | 10-2012-0038250 A | 4/2012 |
| KR | 1020130075177 A | 7/2013 |
| KR | 1020150119737 A | 10/2015 |
| KR | 1020150127351 A | 11/2015 |
| KR | 1020160043244 A | 4/2016 |
| KR | 101629032 B1 * | 6/2016 |
| WO | 2017/178330 A1 | 10/2017 |

OTHER PUBLICATIONS

Machine translation of JP-2015205636-A (Year: 2015).*
First Office Action from National Intellectual Property Administration of People's Rebpublic of China for Chinese Patent Application No. 2018115001382, dated Aug. 2, 2022, with English translation, 18 pages.
Notice of Patent Allowance from Korea Intellectual Property Office for Korean Patent Application No. 10-2018-0122296, dated Mar. 27, 2023, 5 pages, with English translation.
Office Action from German Patent and Trademark Office for German Patent Application No. 102018221116.7, dated Jul. 17, 2023, 10 pages, with English translation.

* cited by examiner

VEHICLE AND CONTROL METHOD THEREOF

CROSS-REFERENCE TO RELATED APPLICATION

This application claims the benefit of Korean Patent Application No. 10-2018-0122296, filed on Oct. 15, 2018 in the Korean Intellectual Property Office, the disclosure of which is incorporated herein by reference.

BACKGROUND

1. Field

Embodiments of the present disclosure relate to a vehicle and a control method thereof, and more specifically, to a technique for controlling a steering device to minimize pulling of a vehicle.

2. Description of the Related Art

A vehicle may be unbalanced due to various factors when the vehicle runs straight. In this case, a pulling phenomenon may occur so that the vehicle is biased to one side regardless of the intention of a driver.

When the pulling phenomenon occurs, a driver manipulates a steering wheel with a certain force such that the steering wheel is directed opposite to a pulling direction of the vehicle to allow the vehicle to run straight.

SUMMARY

Therefore, it is an aspect of the present disclosure to provide a vehicle and a control method thereof capable of compensating for steering control based on vehicle's intrinsic influences and environmental influences, thereby performing steering compensation control accurately.

Additional aspects of the disclosure will be set forth in part in the description which follows and, in part, will be obvious from the description, or may be learned by practice of the disclosure.

In accordance with one aspect of the present disclosure, a vehicle includes a storage unit; a driving unit configured to drive a steering device of the vehicle; a sensor configured to acquire a plurality of detection signals including a steering angle and a steering torque of the vehicle; and a controller configured to determine whether the vehicle is in a predetermined stable running state based on the plurality of detection signals, wherein, when the vehicle is in the predetermined stable running state, the controller extracts reference information including a relationship between the steering angle and the steering torque of the vehicle at at least one past time point, stores the reference information in the storage unit, and controls the driving unit based on a difference between the reference information and the steering angle and the steering torque of the vehicle measured at the at least one time point after the past time point.

The controller may determine a deflection value and a steering recovery value based on the relationship between the steering angle and the steering torque of the vehicle at the at least one past time point.

The controller may determine the deflection value having left or right directionality and the steering recovery value corresponding to the deflection value.

The controller may determine an average deflection value based on the deflection value, determine an average steering recovery value based on the steering recovery value, and extract the reference information by using the average deflection value and the average steering recovery value.

The controller may extract a steering stoppage frictional force based on the relationship between the steering angle and the steering torque of the vehicle at the at least one past time point and start to control the driving unit based on the steering stoppage frictional force after the past time point.

The controller may extract an average steering stoppage frictional force based on the steering stoppage frictional force extracted at the at least one past time point and start to control the driving unit based on the average steering stoppage frictional force.

The controller may extract environment information based on the difference between the reference information and the steering angle and the steering torque of the vehicle measured after the past time point.

The controller may assign a weight to at least one element constituting the reference information and change at least one weight based on the difference between the reference information and the steering angle and the steering torque of the vehicle measured at the at least one time point after the past time point.

In accordance with another aspect of the present disclosure, a method of controlling a vehicle includes driving a steering device of a vehicle; acquiring a plurality of detection signals including a steering angle and a steering torque of the vehicle; determining whether the vehicle is in a predetermined stable running state based on the plurality of detection signals; extracting reference information including a relationship between the steering angle and the steering torque of the vehicle at at least one past time point and storing the reference information when the vehicle is in the predetermined stable running state; and controlling a driving unit based on a difference between the reference information and the steering angle and the steering torque of the vehicle measured at the at least one time point after the past time point.

The controlling of the driving unit may include determining a deflection value and a steering recovery value based on the relationship between the steering angle and the steering torque of the vehicle at the at least one past time point.

The controlling of the driving unit may include determining the deflection value having left or right directionality and the steering recovery value corresponding to the deflection value.

The extracting and storing of the reference information may include determining an average deflection value based on the deflection value, determining an average steering recovery value based on the steering recovery value, and extracting the reference information by using the average deflection value and the average steering recovery value.

The controlling of the driving unit may include extracting a steering stoppage frictional force based on the relationship between the steering angle and the steering torque of the vehicle at the at least one past time point and starting to control the driving unit based on the steering stoppage frictional force after the past time point.

The controlling of the driving unit may include extracting an average steering stoppage frictional force based on the steering stoppage frictional force extracted at the at least one past time point and starting to control the driving unit based on the average steering stoppage frictional force.

The extracting and storing of the reference information may include extracting environment information based on the difference between the reference information and the steering angle and the steering torque of the vehicle measured after the past time point.

The controlling of the driving unit may include assigning a weight to at least one element constituting the reference information and changing at least one weight based on the difference between the reference information and the steering angle and the steering torque of the vehicle measured at the at least one time point after the past time point.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
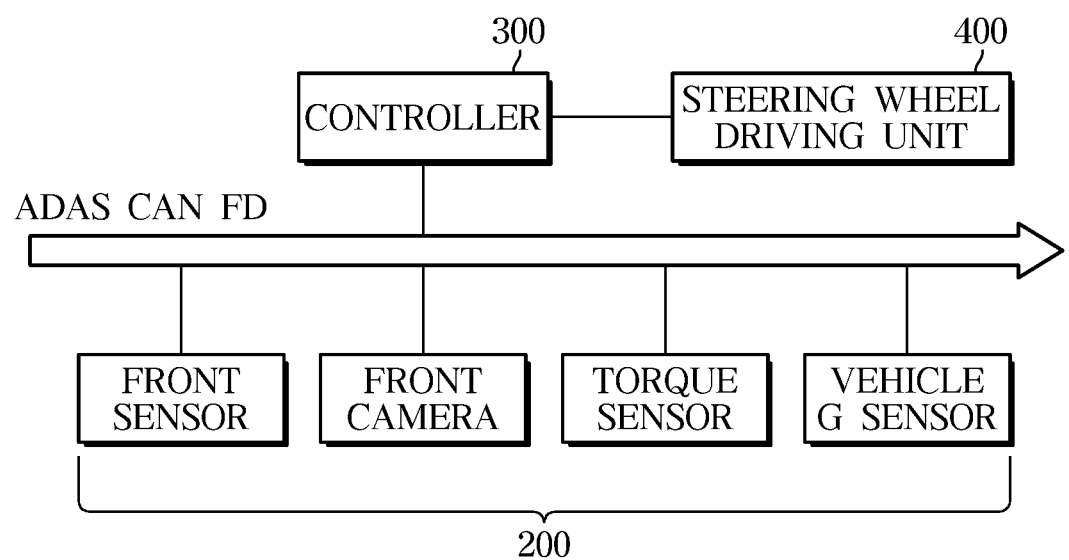
FIG. 1 is a view showing a structure in which a vehicle according to one embodiment receives signals from a plurality of sensors to perform the integrated control.

Like reference numerals refer to like elements throughout the specification. This specification does not describe all the elements of the embodiments, and the general contents of the related art or duplicative contents in the embodiments will be omitted. The terms "unit," "module," "member," and "block" used herein may be implemented by hardware or software. It is also possible that a plurality of units, modules, members, and blocks are implemented as one element, or one unit, module, member, or block includes a plurality of elements in accordance with the embodiments.

Throughout the specification, when an element is referred to as being "connected" to another element, it may be directly connected or indirectly connected to another element. The indirect connection includes a connection through a wireless communication network.

In addition, when some part "includes" some elements, unless explicitly described to the contrary, it means that other elements may be further included but not excluded.

Throughout the specification, when a member is referred to as being located "on" another member, a third member may be present between the two members in addition to the two members being in contact.

The terms such as "first" or "second" may be used to distinguish one element from another, but the elements are not limited by the terms Singular forms are intended to include plural forms unless the context clearly indicates otherwise.

Reference numerals of operations are used for convenience of description, and the reference numerals do not indicate the order of the operations. The operations may be performed in an order that is different from the described order unless a specific order is clearly described in context.

Hereinafter, an operation principle and embodiments of the present disclosure will be described with reference to the accompanying drawings.

When the vehicle is running, the pulling of the vehicle may be determined by measuring a steering torque, a yaw angle, a steering angle, and a vehicle speed.

In this case, when the driver performs steering control through compensation control with a steering torque generated when driving straight to follow the center of a lane where the pulling is expected, the vehicle may be biased to one side of the lane or the driver may feel bilateral asymmetric control due to vehicle's intrinsic influences (e.g., pulling, steering asymmetric frictional force and suspension devices) and environmental influences (e.g., road gradient).

However, when the driver is driving straight through the above process, an accurate compensation control is difficult because the pulling is calculated and compensated by accumulating the degree of steering torque without taking various other influences into consideration.

FIG. 1 is a view showing a structure in which a vehicle according to one embodiment receives signals from a plurality of sensors to perform the integrated control.

Referring to FIG. 1, in embodiments, a vehicle 1 includes one or more sensors 200, a controller 300, and a driving unit 400.

The sensors 200 may include various devices such as a front camera, a steering angle sensor, a torque sensor, and a vehicle G sensor capable of sensing or recognizing objects.

The sensors 200 generate and output different detection signals when detecting an object. In addition, the detection signals output from the sensors 200 include a steering torque at each time point for braking the vehicle 1 according to a result of sensing the object.

One or more controllers of the vehicle 1 integrally manages signals output from a plurality of sensors so as to perform the collision avoidance function against a sensed object.

Meanwhile, a driver assistance system may include a plurality of devices connected through a vehicle communication network (NT). For example, the driver assistance system may include a forward collision warning (FCW) system, an advanced emergency braking system (AEBS), an adaptive cruise control (ACC) system, a lane departure warning system (LDWS), a lane keeping assist system (LKAS), a blind spot detection (BSD) system, and a rear-end collision warning (RCW) system.

The devices included in the vehicle 1 may communicate with each other through the vehicle NT. The vehicle NT is a communication system which can adopt a communication protocol such as a media oriented systems transport (MOST) having a communication rate up to 24.5 Mbps (mega-bits per second), a FlexRay having a communication rate up to 10 Mbps, a controller area network (CAN) having a communication rate in the range of 125 kbps (kilo-bits per second) to 3.7 Mbps and a local interconnect network (LIN) having a communication rate of 20 kbps. Such a vehicle NT may adopt a single communication protocol such as the MOST, the FlexRay, the CAN, or the LIN and may employ a plurality of communication protocols.

The controller 300 may integrate a plurality of detection signals received from the sensor 200 and output an integrated control signal.

In detail, the controller 300 determines the sensing result, that is, determines whether the detection signal is on based on the detection signal transmitted from the sensor 200. Based on the determination result, the controller 300 generates and outputs an integrated control signal for controlling the driving unit 400. Meanwhile, the controller 300 includes a memory for storing an algorithm to control the operation of components in the vehicle 1 or data of a program for reproducing the algorithm and a processor that executes the above operation by using the data stored in the memory. In embodiments, the memory and the processor may be implemented as separate chips. Alternatively, the memory and the processor may be implemented as a single chip.

In addition, the controller 300 may be provided in the vehicle 1 as a separate module for generating an integrated control signal.

The driving unit 400 may receive the integrated control signal from the controller 300 to drive the steering device of the vehicle 1.

Figure 2:
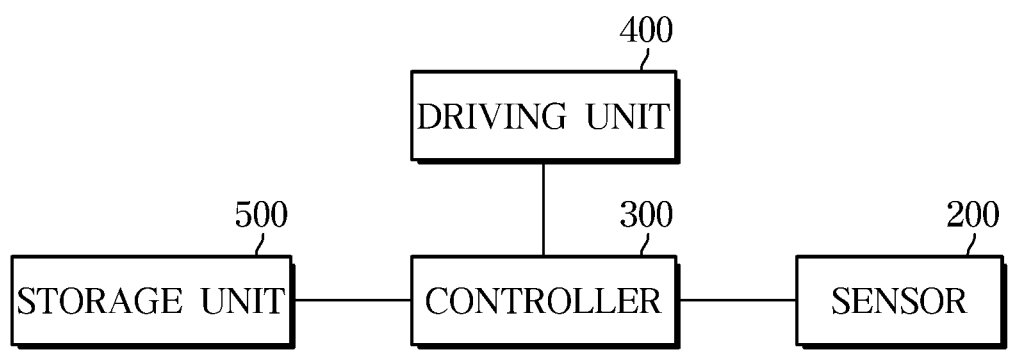
FIG. 2 is a control block diagram according to one embodiment.

FIG. 2 is a control block diagram according to one embodiment.

Referring to FIG. 2, a vehicle according to one embodiment may include a storage unit 500, a driving unit 400, a sensor 200, and a controller 300.

In embodiments, the storage unit 500 may store reference information including a relationship between a steering angle and a steering torque of the vehicle at one or more past time points extracted by the controller 300 as described below.

The reference information is obtained by measuring data of a steering angle sensor and a torque sensor of the vehicle while driving and refers to data obtained when the vehicle stably runs straight. Details of the reference information will be described below.

The driving unit 400 may drive the steering device of the vehicle. In embodiments, the driving unit 400 may be implemented as an apparatus that changes the running direction of the vehicle based on the intention of a driver or the extraction result of the controller 300.

In one embodiment, the driving unit 400 includes a steering wheel and a steering shaft and is an operating mechanism for transmitting a steering force of a driver to a gear device. In another embodiment, the driving unit 400 may include a gear device for transmitting a steering force to a running link mechanism by changing the direction of the steering force while increasing a rotational force and a link mechanism that transmits an operational force of the gear device to front wheels while properly supporting the relative position of left and right wheels.

The sensors 200 may acquire a plurality of detection signals including a steering angle and a steering torque.

When the vehicle is in a predetermined stable running state, the controller 300 extracts reference information including a relationship between the steering angle and the steering torque of the vehicle at one past time point or multiple past time points, stores the reference information in the storage unit 500, and controls the driving unit 400 based on the difference between the reference information and the steering angle and the steering torque of the vehicle measured at one driving time point or multiple driving time points after the one or more past time points.

The predetermined stable running state refers to a situation in which the vehicle stably runs straight under a predetermined condition.

The controller 300 may determine a deflection value and a steering recovery value based on the relationship between the steering angle and the steering torque of the vehicle at the one past time point or at each of multiple past time points. As described below, the controller 300 can graphically extract the relationship between the steering angle and the steering torque and can determine the deflection value which indicates the degree of bias of the vehicle from the center and the steering recovery value which indicates a steering recovery force by using a nodal point between a gradient of a graph and the axis.

The controller 300 may determine the deflection value having left or right directionality and the steering recovery value corresponding to the deflection value.

The controller 300 may determine an average deflection value based on the deflection value, determine an average steering recovery value based on the steering recovery value, and extract the reference information by using the average deflection value and the average steering recovery value. In embodiments, the controller 300 may extract average values based on the deflection value having the right or left directionality and the steering recovery value to extract the reference information.

In addition, the controller 300 may extract a steering stoppage frictional force based on the relationship between the steering angle and the steering torque of the vehicle at one past time point.

The steering stoppage frictional force may be extracted as an average torque obtained when the steering angle is stationary.

The controller 300 may extract an average steering stoppage frictional force based on the steering stoppage frictional force extracted at multiple past time points and start to control the driving unit 400 based on the average steering stoppage frictional force. In embodiments, the controller 300 may further apply the frictional force to output a predetermined torque when starting the steering control.

The controller 300 may extract environment information based on the difference between the reference information and the steering angle and the steering torque of the vehicle measured after the past time point.

The controller 300 may extract the deflection state of the vehicle based on the difference between the reference information extracted as described above and information extracted after the past time point by the sensor 200.

In addition, the controller 300 may assign a weight to at least one element constituting the reference information for compensation control and may change at least one weight based on the difference between the reference information and the steering angle and the steering torque of the vehicle measured at the one or more driving time points after the past time point.

The controller 300 may determine that the steering recovery force is strong when a graph having a large gradient is formed and that the steering recovery force is weak when a graph having a small gradient is formed.

The controller 300 may include a memory for storing an algorithm to control the operation of components in the vehicle or data of a program for reproducing the algorithm and a processor that executes the above operation by using the data stored in the memory. In this case, the memory and the processor may be implemented as separate chips. Alternatively, the memory and the processor may be implemented as a single chip.

At least one component may be added or deleted corresponding to the performance of the components of the vehicle shown in FIG. 2. It will be readily understood by those skilled in the art that the relative position of the components can be changed corresponding to the performance or structure of the system.

Meanwhile, the components shown in FIG. 2 refer to software components and/or hardware components such as a field programmable gate array (FPGA) and an application specific integrated circuit (ASIC).

Figure 3:
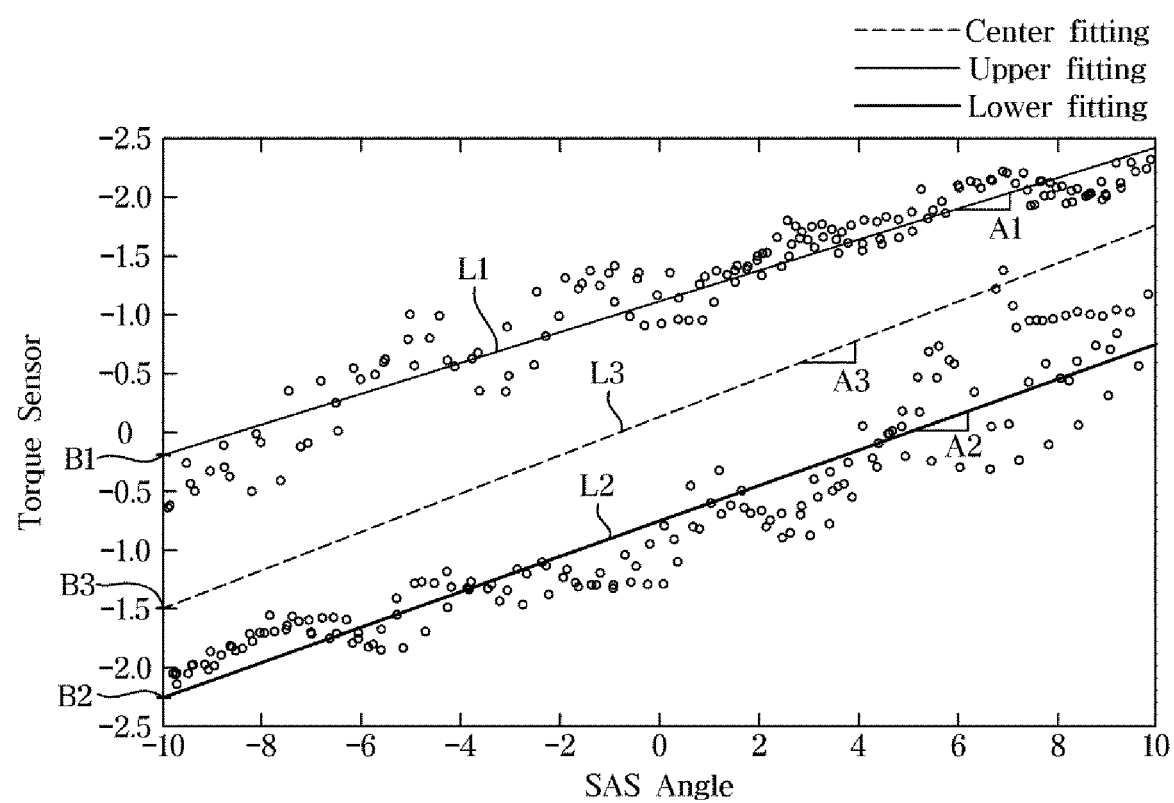
FIG. 3 is a graph showing a relationship between a steering angle and a steering torque according to one embodiment.

FIG. 3 is a graph showing the relationship between the steering angle and the steering torque according to one embodiment.

Referring to FIG. 3, the X-axis represents the steering angle and the Y-axis represents the steering torque. The controller 300 can extract the relationship between the steering angle and the steering torque as shown in FIG. 3 under the condition that the vehicle is stably running straight.

When the vehicle is in the predetermined stable running state, the controller 300 may extract the relationship between the steering angle and the steering torque. The stable running state may include a speed of a running vehicle, a steering angle, a steering angular velocity, a lateral acceleration, a longitudinal axis acceleration, a yaw rate, and a curvature value of a running vehicle.

Meanwhile, the controller 300 can extract the relationship between a right steering angle and a right steering torque and the relationship between a left steering angle and a left steering torque.

The relationship between the right steering angle and the right steering torque can be approximated by L1, which is a linear function in the graph, and the relationship between the left steering angle and the left steering torque can be approximated by a linear function L2 in the graph. Each function can be expressed by the following equation.

$$T = A \cdot SA + B \quad \text{[Equation 1]}$$

In Equation 1, T denotes a steering torque, A denotes a gradient of the graph, SA denotes a steering angle, and B denotes a nodal point between the graph and the Y axis.

Gradients A1 and A2 of L1 and L2 may correspond to the steering recovery value, which is a steering recovery torque of the vehicle. Further, nodal points B1 and B2 where L1 and L2 intersect the Y axis may correspond to the deflection value of the vehicle which indicates the degree of bias of the vehicle to one side from the center. Meanwhile, the controller 300 can extract an average value of the two graphs and a graph L3 of the average value. The average value graph L3 can be extracted as the average of the gradients of L1 and L2 and the average of the Y-intercepts. The equation used in this calculation is as follows.

$$A3 = \frac{A1 + A2}{2} \quad \text{[Equation 2]}$$

Referring to Equation 2, a gradient A3 of the graph L3, which is the average value, may be extracted by using the average of the gradients A1 and A2 of the graphs L1 and L2. Meanwhile, as described above, the gradient may correspond to the steering recovery value in the graph of the relationship between the steering angle and the steering torque.

$$B3 = \frac{B1 + B2}{2} \quad \text{[Equation 3]}$$

Referring to Equation 3, the gradient A3 of the graph L3, which is the average value, can be extracted by using the average of the Y-intercepts B1 and B2 in each of the graphs L1 and L2. Meanwhile, as described above, the Y-intercept may correspond to the deflection value in the graph of the relationship between the steering angle and the steering torque.

In addition, the controller 300 can extract the reference information based on the L1 to L3 extracted through the above operation. The controller 300 may compare the reference information with the state of the vehicle to determine the running state of the vehicle after the past time point and may control the vehicle to run along the center of the road by compensating for the deflection driving.

FIG. 3 shows one embodiment for extracting the reference information, but the operation is not limited as long as it can extract the relationship between the steering angle and the steering torque in the stable running state of the vehicle.

Figure 4:
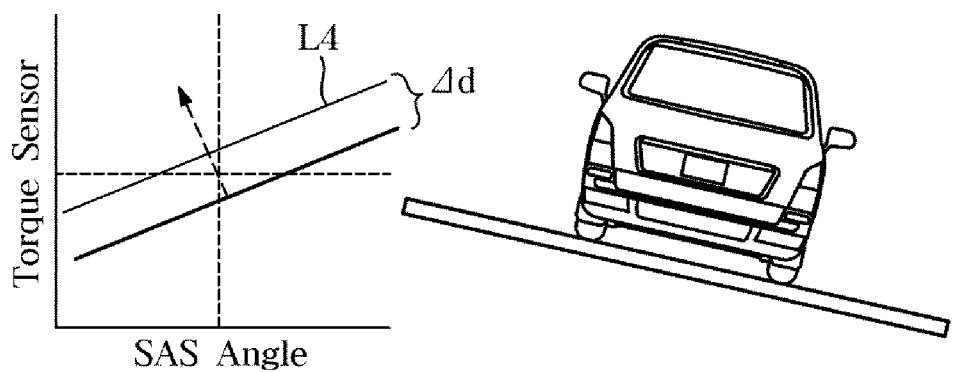
FIG. 4 is a view for explaining a difference between reference information and a running environment of a vehicle according to one embodiment.
Figure 4:
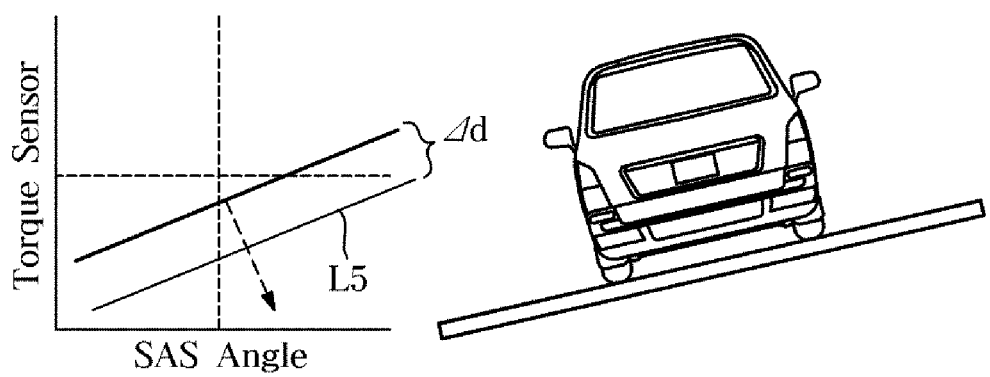

FIG. 4 is a diagram for explaining the difference between the reference information and the running environment of the vehicle according to one embodiment.

Referring to the upper drawings of FIG. 4, the vehicle is running on a road having a slope in a traverse direction. When the vehicle runs on the road while being tilted to the right, the relationship between the steering angle and the steering torque may be extracted in the form of a graph L4 that is further shifted to the left than the graph of the relationship between the steering angle and the steering torque extracted in FIG. 3. In embodiments, since the vehicle is tilted to the right, it is necessary to generate a torque to change the steering to the left, so the graph is extracted in the form which is parallel shifted to the left from the original graph. When the relationship between the steering torque and the steering angle is established to the left as compared with the original graph L3, the controller 300 may determine that the vehicle is tilted to the right so that the controller 300 may perform the compensation control in correspondence with the relationship between the steering torque and the steering angle.

Referring to the lower drawings of FIG. 4, the vehicle is running on a road having a slope. When the vehicle runs on the road while being tilted to the left, the relationship between the steering angle and the steering torque may be extracted in the form of a graph L5 that is further shifted to the right than the graph of the relationship between the steering angle and the steering torque extracted in FIG. 4A. In embodiments, since the vehicle is tilted to the left, it is necessary to generate a torque to change the steering to the right, so the graph is extracted in the form which is parallel shifted to the right from the original graph. When the relationship between the steering torque and the steering angle is established to the right as compared with the original graph L3, the controller 300 may determine that the vehicle is tilted to the left so that the controller 300 may perform the compensation control in correspondence with the relationship between the steering torque and the steering angle.

In addition, since the difference in the relationship between the steering torque and the steering angle relates to an environment of the road on which the vehicle runs, the controller 300 may extract environment information based on the difference between the reference information and the steering angle and the steering torque of the vehicle measured at the current time point. The controller 300 may determine that the vehicle is tilted to the right based on the above difference.

Meanwhile, the embodiment shown in FIGS. 4A and 4B is only one embodiment for extracting the gradient of the road on which the vehicle runs, and there is no limitation for the operation when the operation is performed by using the relationship between the steering torque and the steering angle to extract other running environment of the vehicle as well as the gradient of the road.

Figure 5:
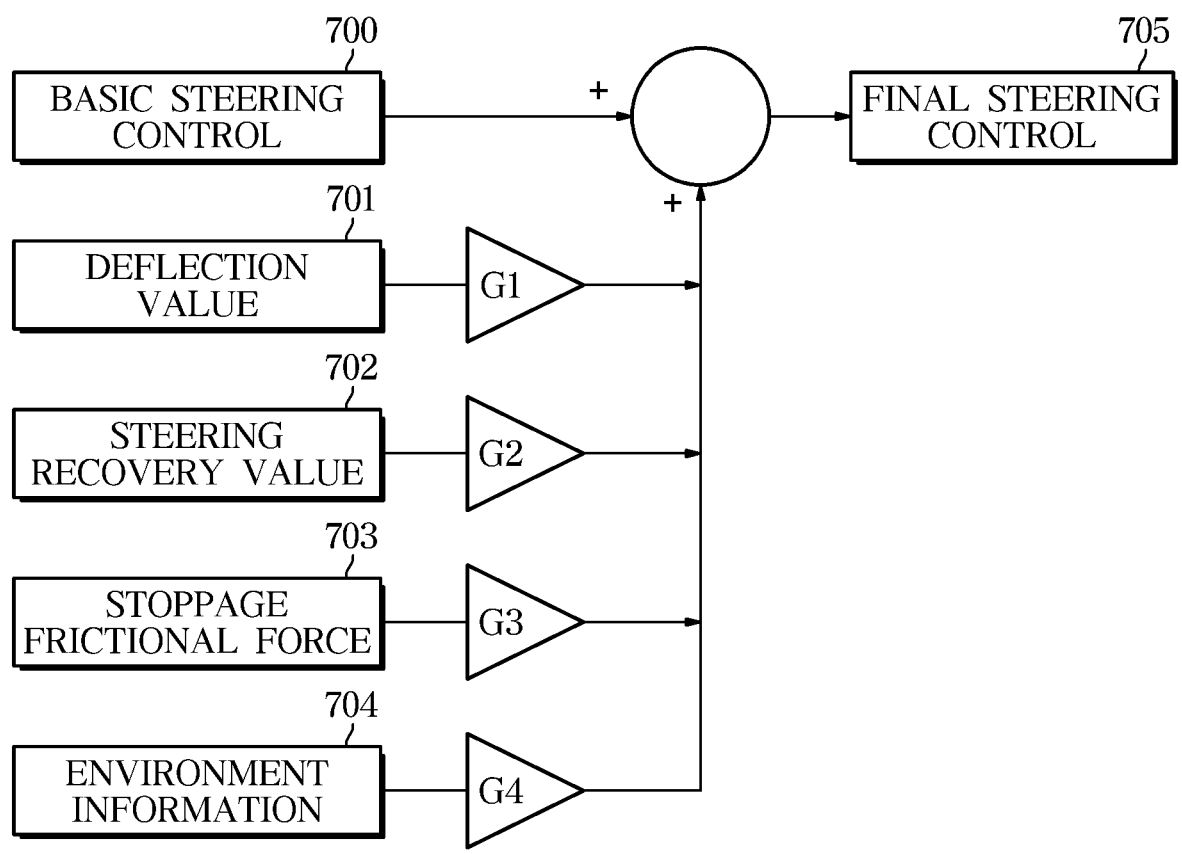
FIG. 5 is a view for explaining compensation control according to one embodiment.

FIG. 5 is a view for explaining the compensation control according to one embodiment.

Referring to FIG. 5, the controller 300 may perform the compensation control based on the steering angle and the steering torque obtained at the current time point while performing the steering control through a basic steering control 700. The controller 300 may control the driving unit 400 based on the difference between the reference information and the steering angle and the steering torque of the vehicle measured at the driving time point after the past time points. In addition, the controller 300 may assign a weight to at least one element constituting the reference information. For example, a weight G1 may be assigned to a deflection value 701, a weight G2 may be assigned to a steering recovery value 702, a weight G3 may be assigned to a stoppage friction 703, and a weight G4 may be assigned to environment information 704. As described above, the controller 300 may control the weights for driving the vehicle corresponding to the reference information.

For example, when the vehicle runs on the road while deviating from the center of the current running road less than a predetermined distance, the controller 300 may determine that the pulling phenomenon is not great, so the controller 300 may control the deflection value and the steering recovery value. According to one embodiment, the controller 300 may control values of G1 and G2.

In addition, when the vehicle runs on the road while deviating from the center of the current running road more than a predetermined distance, the controller 300 may determine that the pulling phenomenon is great, so the controller 300 may control the environment information value. According to one embodiment, the controller 300 may control the value of G4.

Meanwhile, the operation described with reference to FIG. 5 is only one embodiment for explaining the operation of the present disclosure, and there is no limitation for the operation of assigning or changing weights as long as the operation is performed to prevent the pulling phenomenon of the vehicle.

Figure 6:
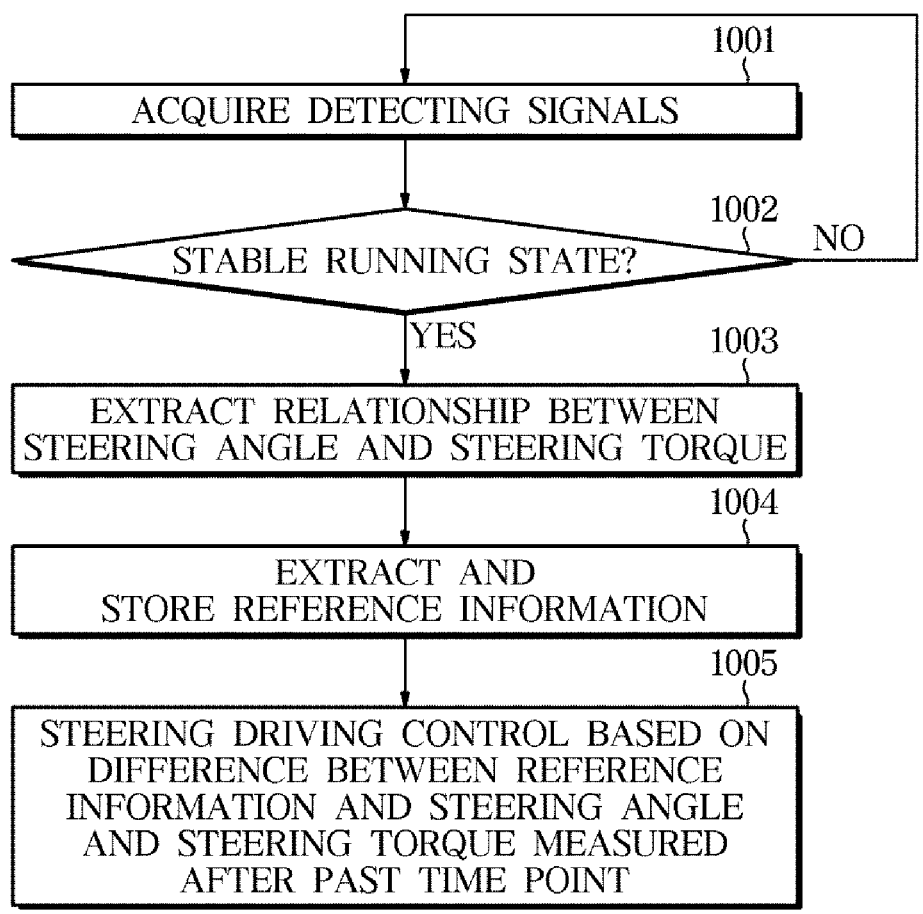
FIGS. 6 and 7 are flowcharts according to one embodiment.

FIG. 6 is a flowchart according to one embodiment.

Referring to FIG. 6, the sensor 200 may acquire a plurality of detection signals (1001). When it is determined that the vehicle is in the predetermined stable running state (1002), the relationship between the steering angle and the steering torque may be extracted (1003). The controller 300 may extract the reference information based on the relationship between the steering angle and the steering torque extracted as described above and may store the reference information in the storage unit 500 (1004). Then, the controller 300 may control the steering driving based on the difference between the extracted reference information and the steering angle and the steering torque of the vehicle measured at a time point after the past time point (1005).

Figure 7:
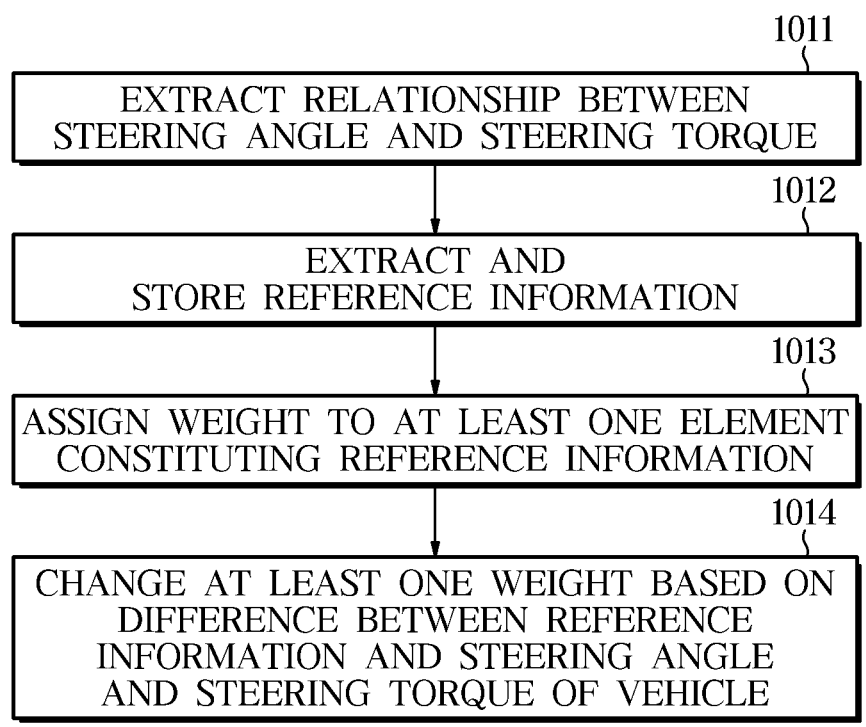

Referring to FIG. 7, the controller 300 may extract the relationship between the steering angle and the steering torque (1011). The controller 300 may extract the reference information and may store the reference information in the storage unit 500 (1012) based on the extracted information. The controller 300 may assign a weight to at least one element constituting the reference information (1031). The at least one element may include a deflection value, an average recovery value, and the like. Meanwhile, the controller 300 may change at least one weight based on the difference between the reference information and the steering angle and the steering torque of the vehicle during the above operation (1014).

Meanwhile, the disclosed embodiments may be implemented in the form of a recording medium for storing instructions executable by a computer. The instructions may be stored in the form of program code and may generate a program module when executed by a processor to perform the operations of the disclosed embodiments. The recording medium may be implemented as a computer-readable recording medium.

The computer-readable recording medium may include all kinds of recording media where instructions which can be decoded by a computer are stored. For example, the recording media may include a read only memory (ROM), a random access memory (RAM), a magnetic tape, a magnetic disk, a flash memory, an optical data storage device, and the like.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

As is apparent from the above description, a vehicle and a control method thereof in accordance with one embodiment of the present disclosure can compensate for the steering control based on vehicle's intrinsic factors and environmental influence factors, thereby performing the steering compensation control accurately.

The embodiments disclosed with reference to the accompanying drawings have been described above. It will be understood by those skilled in the art that various changes in form and details may be made without departing from the spirit and scope of the invention as defined by the appended claims. The disclosed embodiments are illustrative purposes only and should not limit the present disclosure.

What is claimed is:

1. A vehicle comprising:
   a storage unit including a memory configured to store information;
   a driving unit configured to drive a steering device of the vehicle;
   at least one sensor configured to acquire a plurality of detection signals including a steering angle and a steering torque of the vehicle; and
   a controller including a processor and configured to determine whether the vehicle is in a predetermined stable running state based on the plurality of detection signals, wherein, when the vehicle is in the predetermined stable running state, the controller is configured to extract reference information including a relationship between the steering angle and the steering torque of the vehicle at one or more past time points and store the reference information in the storage unit, and further configured to control the driving unit based on a difference between the reference information and the steering angle and the steering torque of the vehicle measured at one or more driving time points after the one or more past time points;
   wherein the controller is further configured to extract a steering stoppage frictional force based on the relationship between the steering angle and the steering torque of the vehicle at the one or more past time points and start to control the driving unit based on the steering stoppage frictional force after the one or more past time points;

wherein the steering stoppage frictional force is an average torque of the steering torques obtained when the steering angle is stationary;

wherein the controller is further configured to extract an average steering stoppage frictional force based on the steering stoppage frictional force extracted at the one or more past time points and start to control the driving unit based on the average steering stoppage frictional force;

wherein the reference information includes a deflection value, a steering recovery value, and the steering stoppage frictional force; and wherein the controller is further configured to assign a weight to the deflection value, the steering recovery value, and the steering stoppage frictional force constituting the reference information and change the weight based on the difference between the reference information and the steering angle and the steering torque of the vehicle measured at the one or more driving time points after the one or more past time points.

2. The vehicle according to claim 1, wherein the controller is configured to determine the deflection value having left or right directionality and the steering recovery value corresponding to the deflection value.

3. The vehicle according to claim 1, wherein the controller is configured to determine an average deflection value based on the deflection value, determine an average steering recovery value based on the steering recovery value, and extract the reference information based on the average deflection value and the average steering recovery value.

4. The vehicle according to claim 1, wherein the controller is configured to extract environment information based on the difference between the reference information and the steering angle and the steering torque of the vehicle measured after the one or more past time points.

5. A method of controlling a vehicle, the method comprising:

driving a steering device of a vehicle;

acquiring a plurality of detection signals including a steering angle and a steering torque of the vehicle;

determining whether the vehicle is in a predetermined stable running state based on the plurality of detection signals;

extracting reference information including a relationship between the steering angle and the steering torque of the vehicle at one or more past time points and storing the reference information when the vehicle is in the predetermined stable running state; and controlling the steering device based on a difference between the reference information and the steering angle and the steering torque of the vehicle measured at one or more driving time points after the one or more past time points;

wherein the controlling comprises extracting a steering stoppage frictional force based on the relationship between the steering angle and the steering torque of the vehicle at the one or more past time points and starting to control the driving unit based on the steering stoppage frictional force after the one or more past time points;

wherein the steering stoppage frictional force is an average torque of the steering torques obtained when the steering angle is stationary;

wherein the controlling comprises extracting an average steering stoppage frictional force based on the steering stoppage frictional force extracted at the one or more past time points and starting to control the driving unit based on the average steering stoppage frictional force;

wherein the reference information includes a deflection value, a steering recovery value, and the steering stoppage frictional force, wherein the controlling comprises assigning a weight to the deflection value, the steering recovery value, and the steering stoppage frictional force constituting the reference information and changing the weight based on the difference between the reference information and the steering angle and the steering torque of the vehicle measured at the one or more driving time points after the one or more past time points.

6. The method according to claim 5, wherein the controlling comprises determining the deflection value having left or right directionality and the steering recovery value corresponding to the deflection value.

7. The method according to claim 5, wherein the extracting and storing of the reference information comprises determining an average deflection value based on the deflection value, determining an average steering recovery value based on the steering recovery value, and extracting the reference information by using the average deflection value and the average steering recovery value.

8. The method according to claim 5, wherein the extracting and storing of the reference information comprises extracting environment information based on the difference between the reference information and the steering angle and the steering torque of the vehicle measured after the one or more past time points.

* * * * *